United States Patent [19]

Faconti, Jr.

[11] 3,795,059
[45] Mar. 5, 1974

[54] TRAINING SIMULATOR WITH NOVEL MALFUNCTION INSERTION

[75] Inventor: Victor Faconti, Jr., Binghamton, N.Y.

[73] Assignee: The Singer Company, New York, N.Y.

[22] Filed: Oct. 30, 1970

[21] Appl. No.: 85,668

[52] U.S. Cl. .................................. 35/12 D, 35/11
[51] Int. Cl. ............................ G09b 9/08, B64g 7/00
[58] Field of Search........... 35/11, 12 K, 12 N, 10.2; 340/172.5

[56] References Cited
UNITED STATES PATENTS

| | | | |
|---|---|---|---|
| 3,247,498 | 4/1966 | Sadvary et al. ..................... | 340/213 |
| 3,200,264 | 8/1965 | Lindenthal et al. ................. | 307/88.5 |
| 3,217,145 | 11/1965 | Suski.................................. | 235/92 |
| 2,860,286 | 11/1958 | Ost..................................... | 315/84.6 |
| 3,400,471 | 10/1968 | Papin et al......................... | 35/12 K |
| 3,591,931 | 7/1971 | Schuster............................. | 35/11 |
| 3,594,921 | 7/1971 | Quicker, Jr. ....................... | 35/11 |
| 3,608,210 | 9/1971 | O'Shea............................... | 35/11 |
| 3,574,283 | 4/1971 | Albers................................. | 35/11 X |

OTHER PUBLICATIONS

Publication—"The DC–10 Flight Simulator," Printed Dec. 1968, page 4–Published by Singer–General Precision, Inc., Link Group.

*Primary Examiner*—Robert W. Michell
*Assistant Examiner*—L. R. Oremland
*Attorney, Agent, or Firm*—William Grobman; James C. Kesterson

[57] ABSTRACT

This specification discloses an automatic malfunction insertion system for a flight simulator wherein the operating conditions under which each aircraft malfunction is likely to occur are stored and compared with actual simulator conditions. Out of the most likely malfunctions as determined by the comparison one is randomly selected for insertion in the simulator, and means are provided to cycle through all possible malfunction before repeating any one malfunction.

5 Claims, 5 Drawing Figures

| PARAMETER | MALF. 1 | MALF. 2 | MALF. 3 | MALF. 4 |
|---|---|---|---|---|
| ALTITUDE | >10,000 | N/A | <20,000 | N/A |
| AIRSPEED | <200 | >300 | >300 | N/A |
| PITCH | N/A | >20 | N/A | >30 |

TRAINING SIMULATOR WITH NOVEL MALFUNCTION INSERTION

This invention relates to flight simulators and more particularly to a system for automatically inserting malfunctions in such a simulator.

One of the primary advantages of using a simulator for flight training is the simulation of malfunctions which, if imposed in an actual aircraft, can be dangerous to the aircraft and crew. Generally in the prior art such malfunctions have been introduced into the simulator by manual manipulation of switches and controls by the instructor. In other systems malfunctions have been time dependent, i.e., they have been programmed to occur at certain mission times. Although both of these methods have worked well, they do not completely simulate the real world. In an actual case malfunctions occur because a given set of conditions have been met. In other words they are condition dependent. For example, in some aircraft oil pressure is lost if the roll attitude of the aircraft exceeds a certain value for a given length of time. This, then, is one of the proper conditions under which such a malfunction should be inserted in a simulator of that aircraft. Other types of malfunctions may occur primarily at certain altitudes or airspeeds and so on. The closer the simulated conditions under which the malfunction occurs in the simulator can be made to those condition under which it would occur in the real world, the more realistic the simulation will be. Furthermore, automatic selection and insertion of malfunctions in accordance with present conditions will simplify the instructor's tasks and allow more efficient utilization of his time and attention.

It is an object of this invention to provide a more realistic malfunction insertion system for a flight simulator.

Another object is to provide a traing system in which the occurrence of a simulated malfunction is wholly condition dependent.

A further object is to provide means for inserting simulated malfunctions in a flight simulator in a realistic manner while relieving the instructor of the usual manual operations associated therewith.

It is also an object to provide improved simulator training for pilots.

Other objects will in part be obvious and will in part appear.

For a fuller understanding of the nature and objects of the invention reference should be had to the following detailed description taken in connection with the accompanying drawings, in which.

Figures 1, 3:
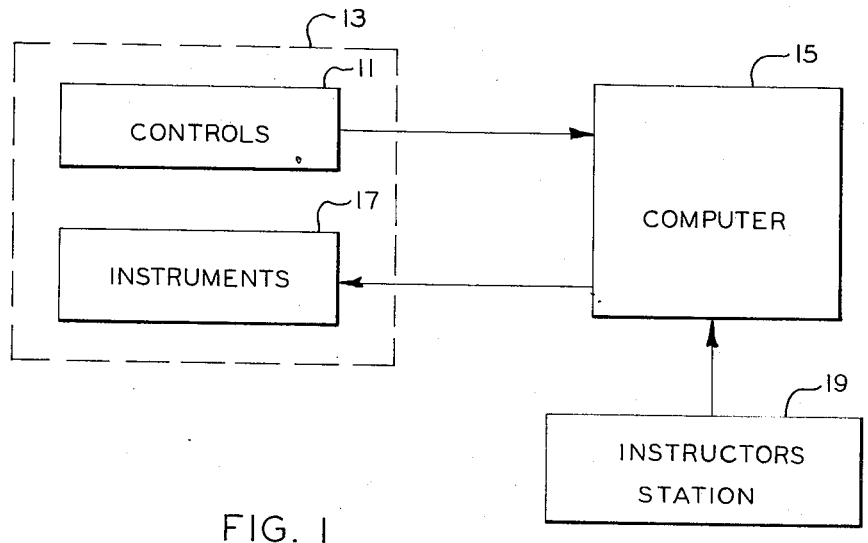
FIG. 1 is a block diagram of a simulator system in which the invention is useful.
FIG. 3 is a brief, exemplary tabulation of malfunctions and conditions under which they are likely to occur.

FIG. 1 shows a basic block diagram of a simulator system in which the present method may be used. Controls 11 located in a simulated cockpit 13 provide inputs to computer 15. In the computer 15 the signals are inputs to simulation equations such as flight (equations of motion) and engine equations. Outputs from computer 15 drive the aircraft instruments 17 also located in cockpit 13. Instructor's station 19 also includes controls providing inputs to computer 15 which are used in a manner to be explained below. The computer 15 may be that disclosed in U.S. Pat. No. 3,363,331, issued on Jan. 16, 1968 to J. M. Hunt.

Figure 2:
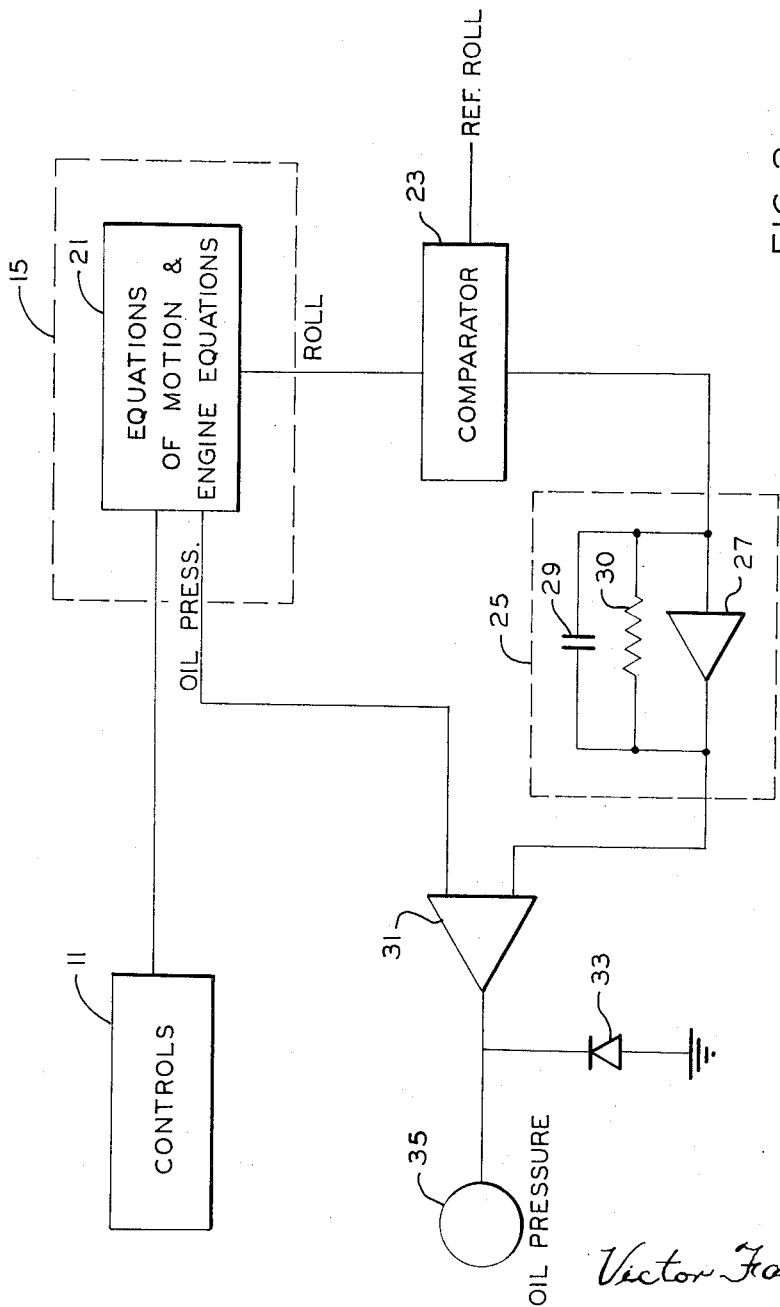
FIG. 2 is a schematic block diagram of an embodiment of the invention useful to simulate one type of malfunction.

Malfunctions may be divided broadly into two categories. There are those which will always happen when a certain set of conditions are met and those which happen less often but are more likely to occur only when certain conditions are present. FIG. 2 shows how one of the first type may be implemented. The example is the one previously mentioned of loss of oil pressure when flying in excess of a given roll attitude. Inputs from controls 11 are provided to the equations of motion and engine equations section 21 of computer 15. Among the outputs of computer 15 is the roll attitude of the aircraft. This roll output is an input to comparator 23 which has as a second input a reference roll value stored in the computer memory and shifted out in conventional fashion for comparison with the computed roll value. If the computed roll value (from computer 15) exceeds the reference roll value, an output from comparator 23 will result in a manner well known in the art. The output of comparator 23 is the input to an integrator 25 comprising an operational amplifier 27, a resistor 30 and a capacitor 29. The amplitude of the output of the integrator 25 is subtracted from the amplitude of an oil pressure output of the engine equations section 21 of computer 15 by a summing amplifier 31. The amplitude of the oil pressure output is computed from the engine equations based on such inputs as throttle setting, exhaust temperature, etc. The output of amplifier 31 is maintaied positive by a diode 33 and provides the input to oil pressure gage 35. The longer the reference roll value is exceeded, the greater is the voltage at the output of integrator 25, until it overcomes the voltage of the oil pressure output from the computer, and a reading of zero results on gage 35. When roll is returned to normal, resistor 30 will discharge capacitor 29, and the output of amplifier 31 and thus oil pressure gage 35, will return to normal.

Selection of values in scaling the integrator 25 and amplifier 31 is based on the characteristics of the aircraft being simulated using well known analog computational methods. For a reference to such design methods see *Electronic Analog and Hybrid Computers* by Korn and Korn, McGraw-Hill Book Company (New York 1964)

Malfunctions which do not fit in the first category may be tabulated as shown on FIG. 3. A list of parameters which affect simulated malfunctions is made, and each malfunction is analyzed to determine what values of these parameters, if any, affect them. On FIG. 3 four examples of malfunctions and a few of the conditions under which they are likely to occur are listed. For example, malfunction 1 might be loss of oxygen. Since oxygen is not used below 10,000 ft., an altitude greater than 10,000 would be a necessary condition for this malfunction. In addition, it might be found that the loss was most likely to occur only at speeds under 200 knots, resulting in the second condition. In a similar manner the remaining malfunctions can be classified and tabulated.

Figure 4:
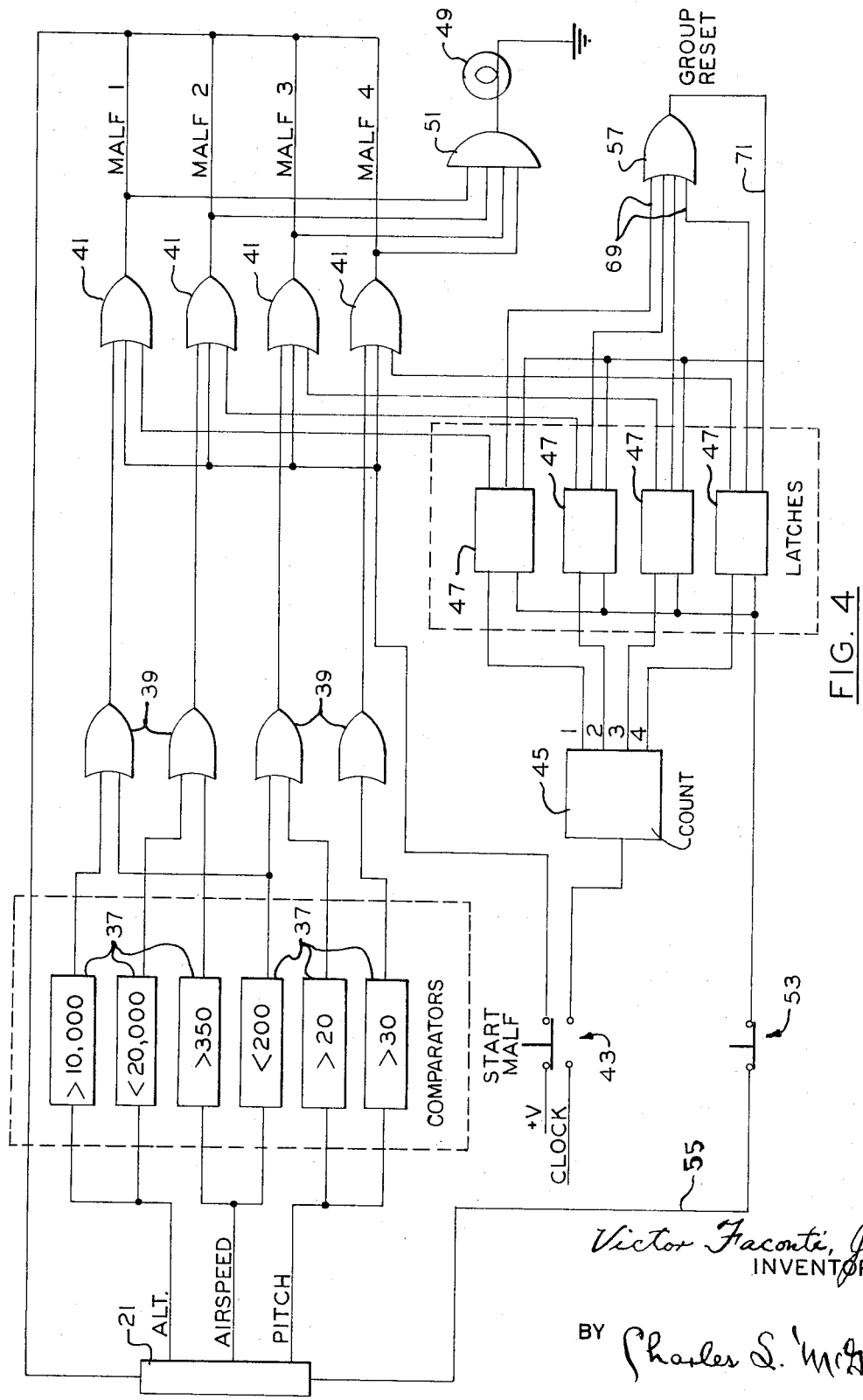
FIG. 4 is a logic diagram of an apparatus for selecting malfunctions shown in the table in FIG. 3.

FIG. 4 shows logic which may be used to implement the data tabulated on FIG. 3. Values of the parameters which affect malfunctions, in the example shown, altitude, airspeed, and pitch, are obtained from computer 21 and provided as inputs to comparators 37 which are preset to the values shown on FIG. 3. For example, the output of the comparator labeled 10,000 will be present only if the altitude signal corresponds to an altitude of more than 10,000 ft. The proper comparator signals are then combined in AND gates 39. Each simulated malfunction has a gate 39 associated with it and the conditions under which it occurs are inputs to this gate. For example, in addition to the greater than 10,000 ft. input of the gate 29 for malfunction 1 there is a less than 200 knots condition. Only when both of these inputs are present will that gate 39 have an output. Similarly, the conditions associated with the other malfunctions are combined in the remaining gates 39.

If is not desirable to continuously train pilots in correcting malfunctions; i.e., other types of training such as normal take-offs and landings must be conducted and, when conducting malfunction training, it is generally desirable to teach only one malfunction at a time. From FIG. 3 it is obvious that more than one malfunction may be possible under a given set of conditions. Thus, it is necessary to control when malfunction training is to be accomplished and to insure that only one malfunction at a time is simulated. It is also generally desirable to cycle through all malfunctions before repeating. To accomplish this the logic shown on the lower portion of FIG. 4 is used.

The outputs of gates 39 are provided as inputs to gates 41, each of which is also associated with a particular malfunction. An output from one of gates 41, indicating a particular malfunction, will result only when all inputs to the gate are present. A second input to each of the gates is from the normally closed side of switch 43, the malfunction start switch, and assures that malfunctions will not be inserted while a selection is being made since pressing switch 43 will remove that input and disable gates 41 from having outputs. The third input to each of gates 41 is a selection input from one of latches 47.

Switch 43, when actuated, will connect a clock input to counter 45 having a number of bits equal to the number of malfunctions (in the example, four bits). This counter will cycle as long as the instructor holds down switch 43 and will stop randomly on one of the numbers with a corresponding output when the switch is released.

The outputs from counter 45 are inputs to latches 47 and may cause an output from the corresponding latch 47 if other conditions are proper, as will be explained in connection with FIG. 5. If one of latches 47 does have an output to one of gates 41 and the corresponding input from gate 39 is also present, then, with the third input from switch 43 also present, once it has been released, an output from that gate 41 will result. This output will cause the corresponding malfunction to be inserted in the simulator via the computer and will also provide an input to OR gate 51. Since gate 51 will have an output when any one of its inputs are present, lamp 49 will light indicating to the instructor that a malfunction has been inserted.

If corresponding inputs from one of latches 47 and gates 39 are not present at any of gates 41, no malfunction will be inserted and lamp 49 will not light. The instructor may then press switch 43 again, allowing counter 45 to cycle through the latches 47 again, release the switch, and continue doing so until lamp 49 does light, indicating that a malfunction has been inserted. After corrective action has been taken by the pilot trainee, the malfunction may be manually reset by opening switch 53, or automatically reset from the computer over line 55 based on proper action being taken. This reset is an input to latches 47 and will remove the output in a manner to be described below. Any latch which has caused a malfunction insertion will remain in a condition where it may not provide another output to its associated gate 41 until all malfunctions have been inserted. To accomplish a reset when all malfunctions have been used, each latch will have an output to gate 57 once it is set, which output will remain after the malfunction is reset. When all malfunctions have been inserted, each of latches 47 will have an output, whereby AND gate 57 will have an output on line 71. This output is used as an input to the latches 47 to reset all latches so that the cycle of malfunctions may be repeated.

Figure 5:
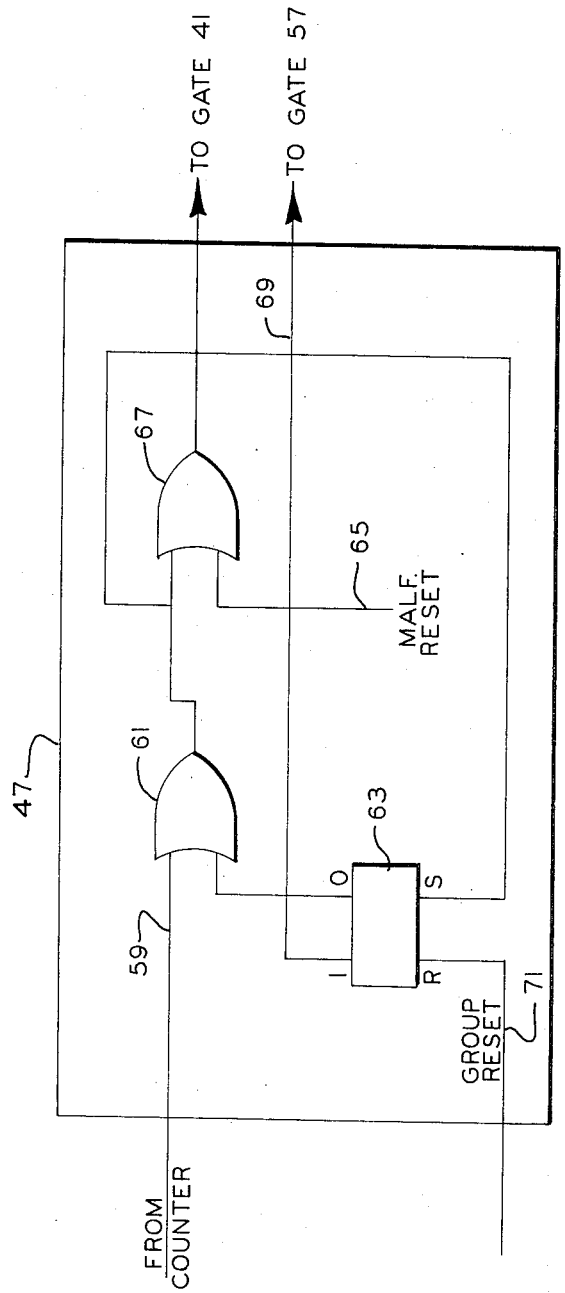
FIG. 5 is a logic diagram of the latch of FIG. 4.

FIG. 5 shows the logic involved in latches 47. When the counter stops on the malfunction number with which the illustrated latch 47 is associated, an input will be present on line 59 to AND gate 61. A flip flop 63 will be reset and will have an output on its zero side providing the second input to gate 61. Thus, gate 61 will have an output. The malfunction reset line 65 will also have a signal on it since switch 53 of FIG. 4 is in its normally closed position. With both inputs present AND gate 67 will also have an output. This output will be used to set flip flop 63 which will now have no output from its zero side but will have an output from its one side. This one output is an input to gate 57 of FIG. 4. With the flip-flop 63 set gate 61 will no longer have an output. However gate 67 will continue to have an output since the input from gate 61 is tied to the output of gate 67. In other words it has been latched by feeding back the output to one of the inputs. When the malfunction reset command is received, the other input from line 65 on gate 67 will be removed by opening switch 53 of FIG. 4 or by removal of the input at the computer, and gate 67 will open and have no output. If the number corresponding to this latch is selected again, the input will not get past gate 61, since the zero side of flip flop 63 is not providing the second input, and nothing further will happen. When all malfunctions have been inserted, all of flip-flops 63 will have outputs on their lines 69 which are inputs to gate 57 of FIG. 4. The resulting output of gate 57 will reset flip-flop 63 via line 71 and a new cycle may be started.

Although the invention has been disclosed using gates, counters, comparators, etc. it may also be practiced by using the logic elements in a digital computer along with proper programs. The random counting disclosed may also be provided to the disclosed embodiment from a computer, as may the other functions. Any number of possible combinations of computer logic and hardware are possible without deviating from the spirit of the invention. Thus, a method of automatically inserting malfunctions in flight simulator under conditions closely approximating those under which such malfunctions would occur during actual flight has been disclosed. Means are also provided to randomly select from malfunctions which are likely under a given set of conditions and to assure cycling through all malfunctions before repeating any of them.

What is claimed is:

1. In a trainer which includes a trainee station having trainer controls and instruments, a computer for receiving information from said trainer controls which are under the control of the trainee and for transmitting to said instruments the results of the changed control and trainee conditions, and an instructor station by means of which an instructor can transmit to said computer initial and changed trainer conditions; apparatus for automatically inserting into said trainer a simulated malfunction; said apparatus comprising
   a. means for storing information representing a plurality of trainer conditions under which said trainer should indicate any of a plurality of malfunctions;
   b. means for continually determining the operating conditions of said trainer and for generating information representative of said operating conditions;
   c. a comparator for receiving the information generated by said determining means and for receiving information stored in said means for storing, said comparator generating an output signal when a coincidence in received information is detected;
   d. means for directing said output signal to the appropriate instruments in said trainer to indicate the appropriate malfunction;
   e. means operable by an instructor to selectively enable and disable said automatic malfunction insertion;
   f. said means to direct said output signal comprising a cyclic counter having a number of bits equal to the total number of said plurality of malfunctions and an equal plurality of AND gates having an associated output of said comparator and a corresponding one of said counter bits as inputs; and
   g. said means operable by said instructor comprising a switch operable by said instructor, said switch being operably coupled to said counter to cause it to cycle while said switch is depressed;
   h. said AND gates also having a disabling input coupled to said switch to prevent outputs from said gates while said counter is cycling.

2. The invention according to claim 1 and further including means to cause all malfunctions to be selected once before repeating any malfunction.

3. The invention according to claim 2 wherein said causing means comprise a plurality of electrical latches interposed between said counter outputs and said AND gates, each of said latches adapted to provide an output when said counter output is applied to at said latch the first time and to set a condition whereby said latch, after said output is reset in response to a rest input, will not provide further outputs in response to an input from said counter until a further input is provided to reset said condition thereby indicating that all of said plurality of malfunctions have been selected once.

4. The invention according to claim 3 wherein each of said latches provides an output indicative of said condition being set and further including an AND gate having as inputs the outputs of all said plurality of latches, said gate providing an output when all inputs are present, said gate providing the input to reset said condition in said latch.

5. The invention according to claim 1 and further including visual indicator means operable in response to the operation of any one of said AND gates to provide a visual indication to AND gates the instructor that a trainer malfunction has been introduced into the operation of the simulator.

* * * * *